United States Patent
Neal

(10) Patent No.: US 11,584,324 B1
(45) Date of Patent: Feb. 21, 2023

(54) VEHICLE COMPARTMENT DIVIDER

(71) Applicant: James S. Neal, Atlanta, GA (US)

(72) Inventor: James S. Neal, Atlanta, GA (US)

( * ) Notice: Subject to any disclaimer, the term of this patent is extended or adjusted under 35 U.S.C. 154(b) by 98 days.

(21) Appl. No.: 17/149,874

(22) Filed: Jan. 15, 2021

(51) Int. Cl.
*B60R 21/02* (2006.01)

(52) U.S. Cl.
CPC .................................. *B60R 21/026* (2013.01)

(58) Field of Classification Search
CPC ... B60R 21/026; B60R 13/0823; B60R 21/06; B60R 7/005; B60R 21/12
See application file for complete search history.

(56) References Cited

U.S. PATENT DOCUMENTS

| | | | |
|---|---|---|---|
| 3,214,211 A | 10/1965 | Setina | |
| 4,595,227 A | 6/1986 | Setina | |
| 5,382,068 A * | 1/1995 | Simmons | B60R 13/0823 160/327 |
| 5,536,057 A | 7/1996 | Stewart | |
| 6,086,128 A | 7/2000 | Whitehead, Sr. | |
| 7,195,297 B2 | 3/2007 | Murray et al. | |
| 7,806,452 B2 | 10/2010 | Storer et al. | |
| 8,690,216 B2 | 4/2014 | Sage | |
| 9,033,389 B2 | 5/2015 | Setina | |
| 10,005,416 B2 | 6/2018 | Setina | |
| 11,027,673 B1 * | 6/2021 | Abdelrahman | B60R 21/12 |
| 2006/0103155 A1 * | 5/2006 | Spater | B60R 21/06 296/24.46 |
| 2008/0136205 A1 * | 6/2008 | Hoffman | B60R 21/06 296/24.46 |
| 2012/0068490 A1 * | 3/2012 | Vance | B60N 2/91 296/24.46 |
| 2012/0111510 A1 * | 5/2012 | Chak | B60R 7/04 160/368.1 |
| 2013/0020824 A1 * | 1/2013 | Tinterow | B60R 21/026 29/428 |
| 2013/0257079 A1 * | 10/2013 | Donovan | B60R 21/026 296/24.43 |
| 2014/0252791 A1 * | 9/2014 | Renforth | B60R 21/12 296/24.31 |
| 2019/0389355 A1 * | 12/2019 | Wheeler | G07F 11/52 |
| 2021/0331629 A1 * | 10/2021 | Marroquin | B60R 13/0823 |
| 2022/0097639 A1 * | 3/2022 | McClymont | B60R 21/026 |

FOREIGN PATENT DOCUMENTS

| | | | | |
|---|---|---|---|---|
| DE | 19923188 A1 | * | 11/2000 | ........... B60H 1/0055 |
| FR | 3010021 A1 | * | 3/2015 | ........... B60R 21/026 |
| KR | 200347815 Y1 | * | 4/2004 | |
| KR | 200491647 Y1 | * | 5/2020 | |
| WO | WO-0050269 A1 | * | 8/2000 | ........... B60R 21/026 |
| WO | WO-2010131055 A1 | * | 11/2010 | ............. B60R 21/12 |

OTHER PUBLICATIONS

Machine Translation of DE19923188 (Year: 2000).*

* cited by examiner

*Primary Examiner* — Paul N Dickson
*Assistant Examiner* — Kurtis Nielson
(74) *Attorney, Agent, or Firm* — Cramer Patent & Design, PLLC; Aaron R. Cramer

(57) ABSTRACT

A vehicle compartment divider comprises a large unit of fabric suitable for personal protective equipment capable of being removably secured between the front seat portion of a motor vehicle and a rear seat portion. The divider comprises a plurality of tie-on straps and a support dowel which extends the length of the divider. Centrally located within the divider is a clear window.

16 Claims, 5 Drawing Sheets

VEHICLE COMPARTMENT DIVIDER

RELATED APPLICATIONS

Not applicable.

FIELD OF THE INVENTION

The present invention relates generally to an automobile compartment divider.

BACKGROUND OF THE INVENTION

Recent events in our history, such as the COVID-19 virus, remind us how susceptible humans are to contaminants in the air we breathe. Whether such contaminants are incidental such as dust, dirt, allergens or the like, or something more dangerous such as bacteria and viruses, many people are left in a susceptible state even if wearing personal protective equipment (PPE). This is nowhere more evident in the close confines of a motor vehicle.

Many of us need to transport others either as part of family responsibilities (transporting elderly relatives to doctor appointments) neighborhood responsibilities (transporting neighborhood children to and from school as part of a carpool operation) or job responsibilities (Uber® or Lyft® driver). No matter the reason, a sneeze or even a cough from any one person in the vehicle is sure to cover the remaining occupants with germs or worse even if they are wearing a mask. Accordingly, there exists a need for a means by which a driver and rear seat passengers in a motor vehicle can be separated in order to prevent the spread of contaminants. The development of the vehicle passenger compartment divider fulfills this need.

SUMMARY OF THE INVENTION

The inventor has recognized the aforementioned, inherent problems and lack in the art and observed that there is a need for a vehicle passenger compartment divider has a planar material which is adapted to prevent passage of a plurality of germs and a plurality of viruses within a vehicle, a viewing window which is disposed on an upper center portion of the planar material, at least six tie strings which are adapted to a plurality of connection points inside of the vehicle, a means for attaching utilized in lieu of the tie strings attaching to the connection points inside of the vehicle, a structural support bar utilized across a top portion of the planar material which is adapted to support along a head liner of the vehicle where no other means of support are available, a plurality of vent openings which are adapted to pass conditioned air from a ventilation system of the vehicle, and a plurality of electrical openings which are disposed near the center console. The viewing window is adapted to a rear seat area and use of a rear-view mirror by a driver of the vehicle as well as forward vision for one or more rear seat occupants. The tie strings are tied in a plurality of knots to secure the planar material in position. The means for attaching includes a first half and a second half.

The planar material may serve to hold the viewing window and the structural support bar contained with a textile sleeve. The planar material may be made of a material selected from the group consisting of a textile fabric material, a vinyl material, a plastic material, or a hybrid blend material. The viewing window may provide vision for an occupant of the rear seat area in a forward-looking manner, while allowing the driver a sight path through the rear-view mirror. The viewing window may be made of a clear flexible vinyl material. The viewing window may be twenty-eight inches wide and fourteen inches tall.

There may be at least three tie strings disposed on each side of each other. The connection points may be selected from the group consisting of a plurality of garment hooks, a plurality of grab handles, a plurality of pillars, a plurality of columns, a plurality of structural components of the seat belt mechanism, or a plurality of trim pieces. The means for attaching may be utilized as supplemental attachment in addition to the tie strings. The first half of the means for attaching may be adapted to the headliner of the vehicle. The structural support bar may be selected from the group consisting of a wooden dowel, a steel rod, or a plastic rod. The vent openings may be located below a front seat area and in the center console.

The vehicle passenger compartment divider may be adapted to separation of the front seat area from a passenger compartment in the vehicle. The vehicle passenger compartment divider may be adapted to directly behind the vehicle's front seats separating the passenger compartment into the front seat area and the rear seat area. The electrical openings may be selected from the group consisting of one or more 12-VDC cigarette lighter outlets, one or more USB outlets, and one or more 120-VAC receptacles. The vent openings and the electrical openings may be provided with a fabric cover that allow for closing and securing of the openings when not in use. The fabric covers may be secured with a means for securing. The means for securing may be a snap fastener or a hook-and-loop-type fastener.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
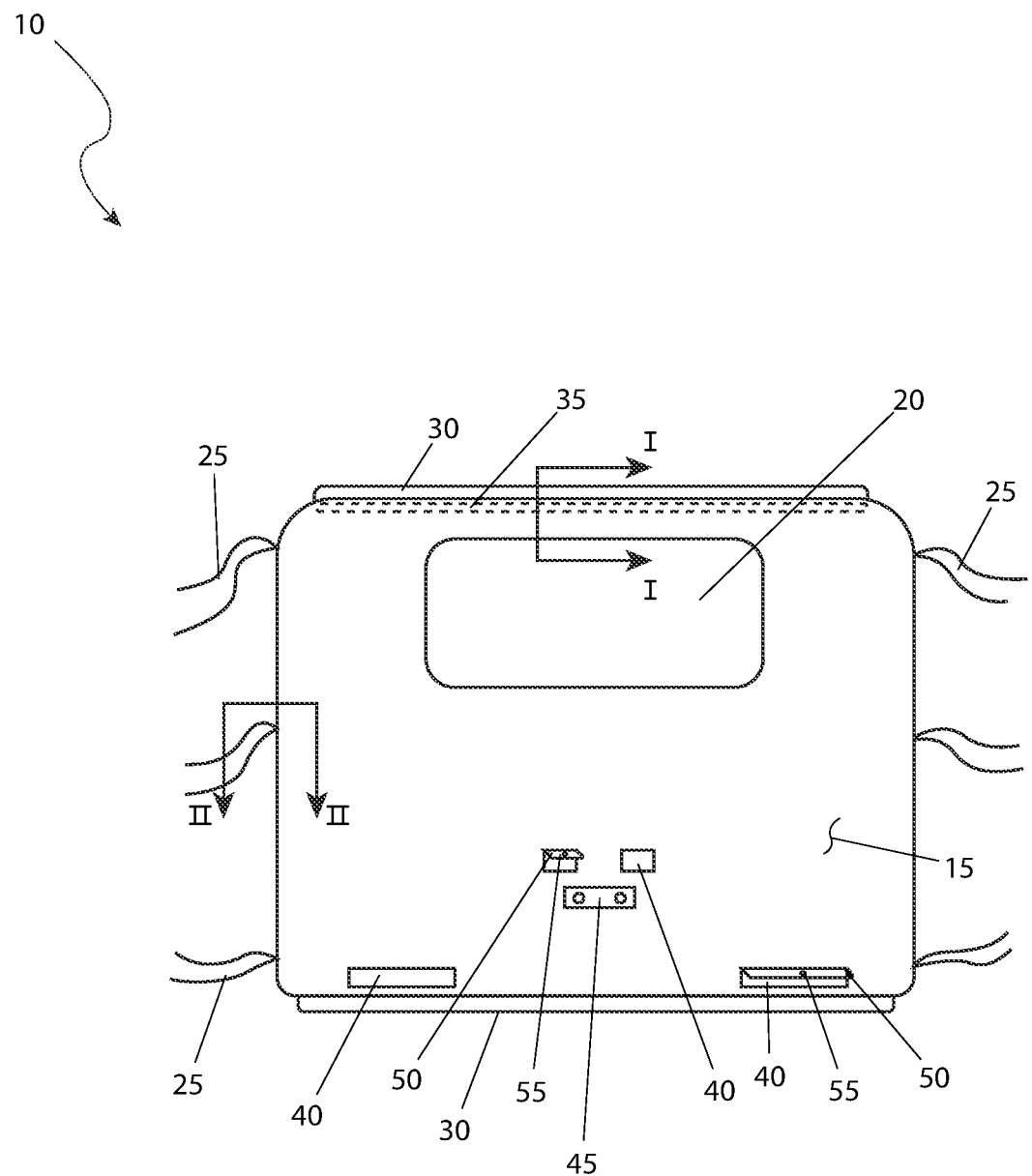
FIG. 1 is a front view of the vehicle passenger compartment divider, according to the preferred embodiment of the present invention.

DESCRIPTIVE KEY 10 vehicle passenger compartment divider
15 textile fabric
20 viewing window
25 tie strings
30 means of attachment
35 structural support bar
40 vent openings 45 electrical openings
50 fabric covers
55 securing means
60 motor vehicle
65 front seats
70 passenger compartment
75 front seat area
80 rear seat area
81 console
82 flexible vent line
83 front dash vent
85 driver
90 rear view mirror
95 front seat passenger
100 console vent openings
105 textile sleeve
110 first half to attachment means
115 headliner
120 second half of attachment means
125 attachment point
130 knot

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a front view of the vehicle passenger compartment divider 10, according to the preferred embodiment of the present invention is disclosed. The vehicle passenger compartment divider 10 (herein also described as the "divider") 10, provides for separation of a front seat area from the remainder of the passenger compartment in a four (4) door motor vehicle. The divider 10 comprises a textile fabric 15 envisioned to be cloth in nature but of a nature so as to prevent the passage of germs, viruses, and the like. Other materials such as vinyl, plastic, hybrid blends, and the like may also be utilized, and as such, the specific nature of the textile fabric 15 is not intended to be a limiting factor of the present invention. It is envisioned that the divider 10 would be made available in multiple sizes to fit all sizes of four (4) door motor vehicles from the smallest sedan up to the largest of trucks or vans. However, a typical-sized version would be approximately fifty-six inches (56 in.) wide and forty-five inches (45 in.) tall for purposes of illustration.

The upper center of the divider 10 is provided with a viewing window 20 for viewing of the rear seat passenger and use of the rear-view mirror by the driver of the vehicle as well as forward vision for the rear seat occupants. The viewing window 20 would be made of a clear flexible vinyl and is envisioned to be approximately twenty-eight inches (28 in.) wide and fourteen inches (14 in.) tall. To hold the divider 10 in position, it is provided with a minimum of six (6) tie strings 25 with at least three (3) located per side. The tie strings 25 would attach to various connection points inside of the motor vehicle including but not limited to garment hooks, grab handles, pillars, columns, structural components of the seat belt mechanism, and trim pieces. Other means of attachment 30 such as hoop-and-loop-type fastener or VELCRO®, snaps, double sided tape, adhesive, and the like may also be used as a primary means of attachment in lieu of the tie strings 25 or as supplemental means of attachment in addition to the tie strings 25. A structural support bar 35 such as a wooden dowel, steel rod, plastic rod or the like, is used across the top of the textile fabric 15 to provide support along the head liner of the vehicle where no other means of support are readily available. A set of multiple vent openings 40 are provided to pass conditioned air from the ventilation system of the motor vehicle. As such the vent openings 40 are located below the seat and in the center console. In a similar manner, a series of multiple electrical openings 45 are provided near the center console for access to 12-VDC cigarette lighter outlets, USB outlets, 120-VAC receptacles, or the like. It is envisioned that the vent openings 40 and electrical openings 45 would be provided with fabric covers 50 that allow for closing and securing of the openings should they not be in use. The fabric covers 50 would be secured with a securing means 55 such as a snap, hook-and-loop-type fastener.

Figure 2:
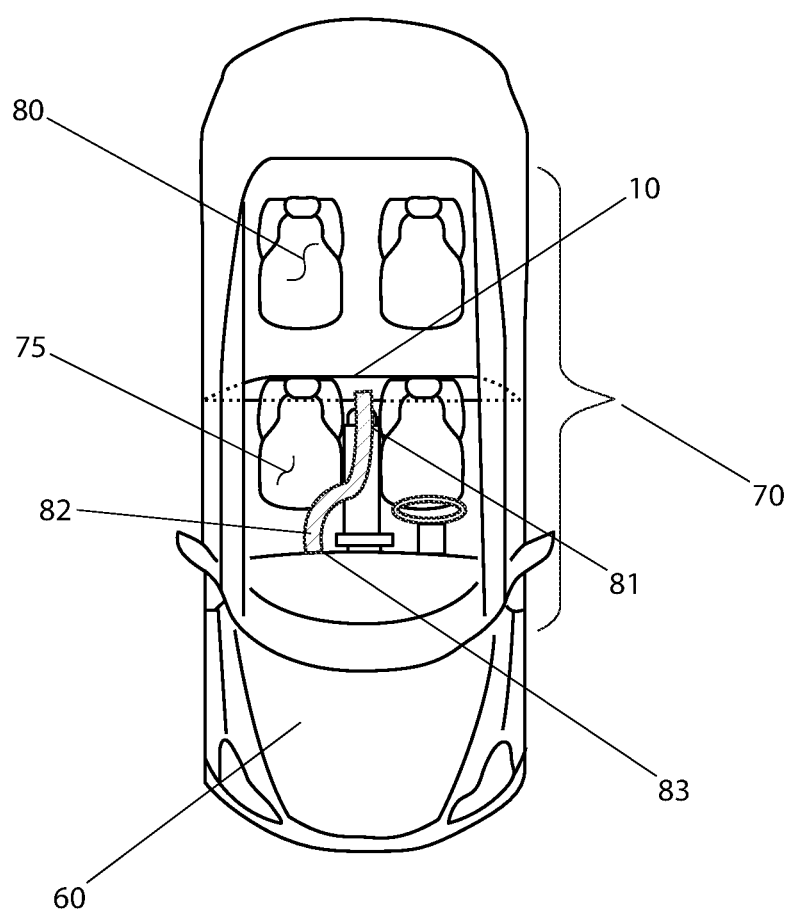
FIG. 2 is a top view of the vehicle passenger compartment divider, shown in an installed state in a motor vehicle, according to the preferred embodiment of the present invention.

Referring next to FIG. 2, a top view of the divider 10, shown in an installed state in a motor vehicle 60, according to the preferred embodiment of the present invention is depicted. The divider 10 is installed directly behind the front seats 65 as shown, thus separating the passenger compartment 70 into a front seat area 75 and a rear seat area 80. As such, any harmful contaminants, such as dust, dirt, germs, bacteria, viruses or the like, present on either the front seat area 75 or the rear seat area 80 is prevented from easily gaining access to the opposing area. Such a feature is viewed as beneficial should the occupants of either the front seat area 75 or the rear seat area 80 be knowingly or unknowingly a carrier of a disease by preventing the spread of airborne droplets. Should a vent opening on the rear of the console 81 not be provided as part of standard or optional equipment on the motor vehicle 60, a flexible vent line 82 may be routed to the front dash vent 83 of the motor vehicle 60 to provide conditioned air to the occupants of the rear seat area 80.

Figure 3:
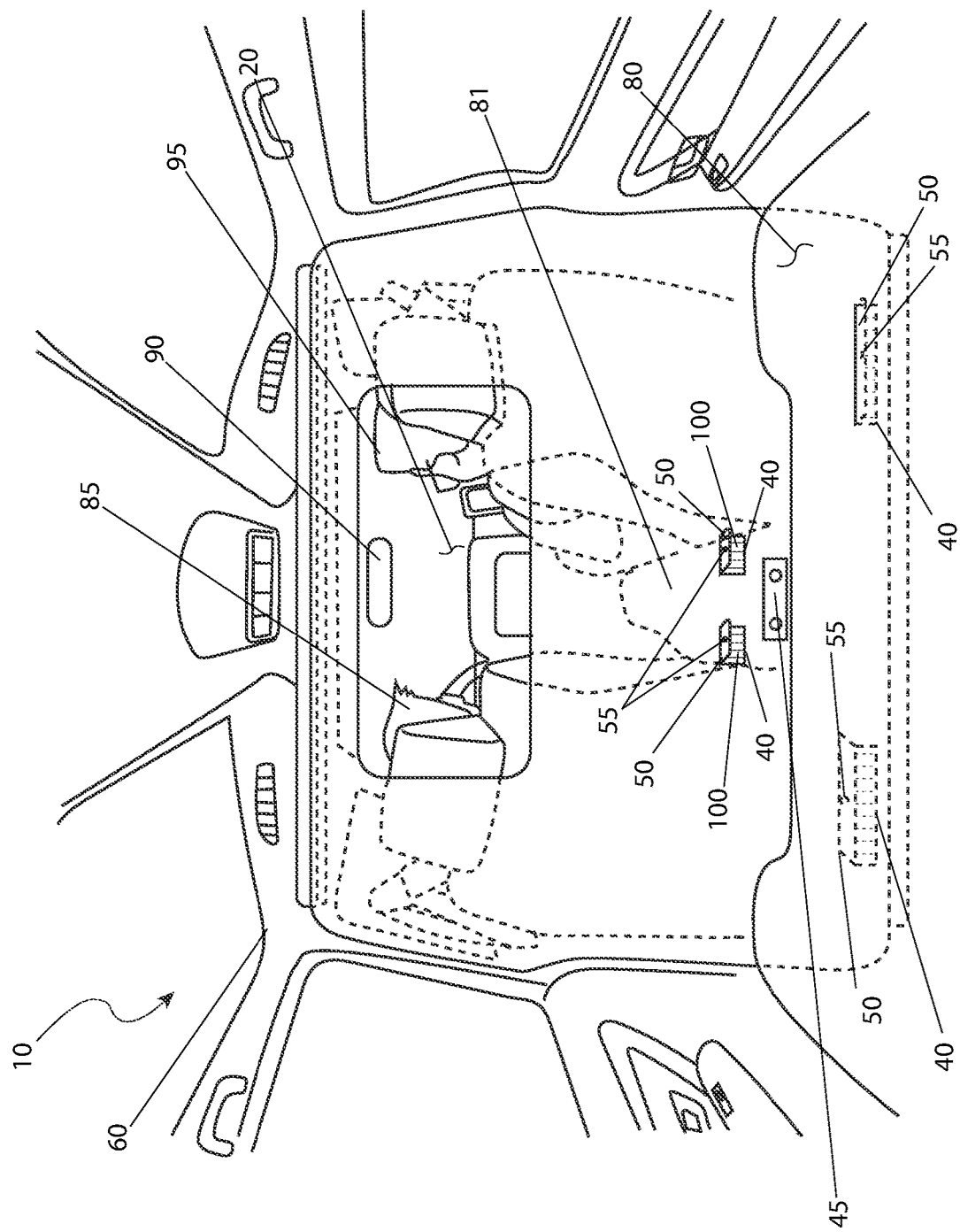
FIG. 3 is an interior perspective view of the vehicle passenger compartment divider, shown in in an installed state in a motor vehicle, according to the preferred embodiment of the present invention.

Referring now to FIG. 3, is an interior perspective view of the divider 10, shown in an installed state in a motor vehicle 60, according to the preferred embodiment of the present invention is shown. This view provides a point of view as seen from an occupant of the rear seat area 80. The viewing window 20 provides vision for the occupant of the rear seat area 80 in a forward-looking manner, while allowing the driver 85 a sight path through the rear-view mirror 90. Verbal and visual communication may still occur between the driver 85, as well as the front seat passenger 95 if present, and the occupant in the rear-view mirror 90. The console vent openings 100 on the console 81 are aligned with the vent openings 40 in the textile fabric 15 to permit conditioned air to flow the rear seat area 80. Access via electrical openings 45 into the console 81 are provided as well.

Figure 4:
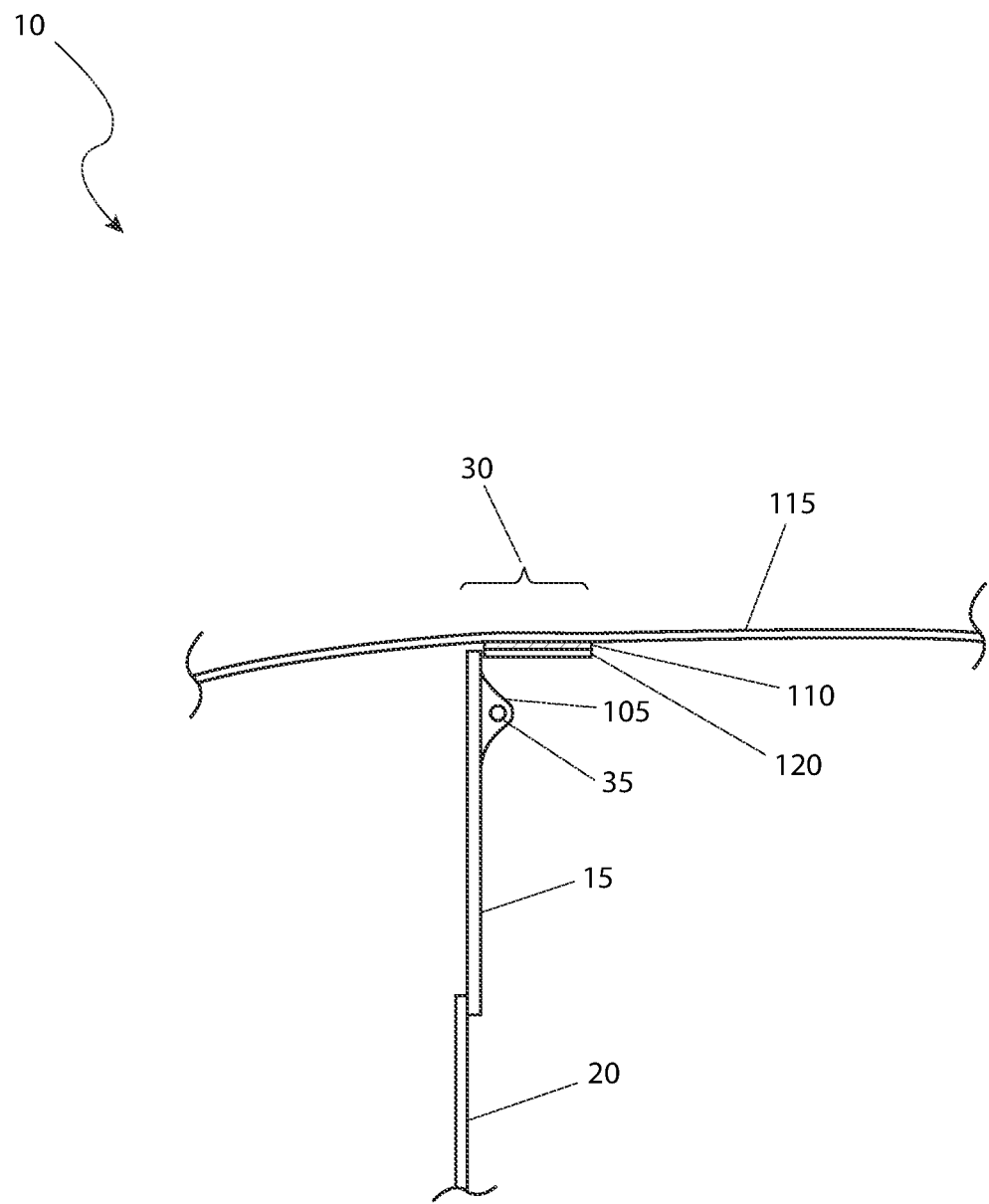
FIG. 4 is a sectional view of the vehicle passenger compartment divider, as seen along a Line I-I, as shown in FIG. 1, according to the preferred embodiment of the present invention; and, FIG. 5 is a sectional view of the vehicle passenger compartment divider, as seen along a Line II-II, as shown in FIG. 1, according to the preferred embodiment of the present invention.

Referring next to FIG. 4, a sectional view of the divider 10, as seen along a Line I-I, as shown in FIG. 1, according to the preferred embodiment of the present invention is disclosed. The textile fabric 15 serves to hold the viewing window 20 as well as the structural support bar 35 contained with a textile sleeve 105 envisioned to be fashioned by sewing. The means of attachment 30, if used, provides for a first half to attachment means 110 that is attached to the headliner 115 of the motor vehicle 60 (as shown in FIG. 3) via mechanical fasteners, adhesive, or other similar means. The second half of attachment means 120 is then attached to the textile fabric 15. The first half to attachment means 110 and the second half of attachment means 120 is depicted as hook and loop fastener for purposes of illustration, however, other methods such as snaps, zippers, or the like may also be utilized.

Figure 5:
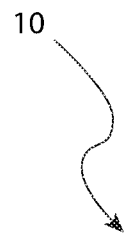
Figure 5:
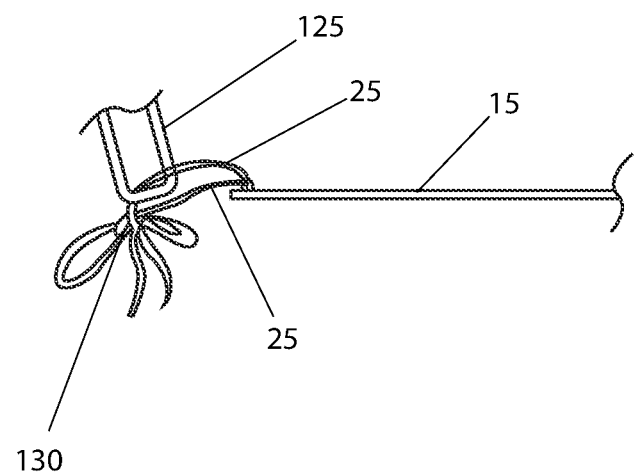

Referring to FIG. 5, a sectional view of the divider 10, as seen along a Line II-II, as shown in FIG. 1, according to the preferred embodiment of the present invention is depicted. The tie strings 25 are attached to the textile fabric 15 via various means such as sewing. The loose ends of the tie strings 25 are routed through an attachment point 125 such as to garment hooks, grab handles, pillars, columns, structural components of the seat belt mechanism, and trim pieces. The tie strings 25 are then tied in knot 130 to secure the divider 10 in position.

2. Operation of the Preferred Embodiment

The preferred embodiment of the present invention can be utilized by the common user in a simple and passenger compartment divider 10 would be constructed in general accordance with FIG. 1 through FIG. 5. The user would procure the divider 10 from conventional procurement channels such as discount stores, department stores, hardware stores, home improvement stores, automotive part stores, mail order and internet supply houses and the like. Special attention would be paid to the overall size of the textile fabric 15, the location of the vent openings 40 and the electrical openings 45 and the means of attachment 30.

During the installation of the divider 10, the following procedure would be followed: the divider 10 is installed with the viewing window 20 at the top of the motor vehicle 60; loop the upmost tie strings 25 on one (1) side, around suitable attachment point 125, as shown in FIG. 3; go to the opposite side of the divider 10 and attach the upmost tie strings 25 to suitable attachment point 125; repeat the process for the remaining tie strings 25 in an alternating side-to-side process. Should the divider 10 be provided with means of attachment 30, they would be attached using the first half to attachment means 110 and the second half of attachment means 120 as shown in FIG. 4. If needed, the flexible vent line 82 would be routed from the front dash vent 83 to the vent openings 40 in the textile fabric 15. At this point in time, the divider 10 is ready for use.

During utilization of the vehicle passenger compartment divider 10, the following procedure would be initiated: the driver 85 and the front seat passenger 95, if necessary, will occupy the front seat area 75 in a customary and transparent manner; the occupants of the rear seat area 80 will enter the via the rear side doors in a normal and transparent manner. Air flow is separated by the divider 10 between the front seat area 75 and the rear seat area 80, along with any air-borne bacteria, germs, viruses and the like. Travel then commences in a normal and transparent manner.

After use of the vehicle passenger compartment divider 10, it is various surfaces of the divider 10 such as the textile fabric 15, the viewing window 20, the fabric covers 50 and the like may be cleaned and sanitized to protect other occupants of the rear seat area 80. Should the features and benefits of the divider 10 no longer be required, it may be removed leaving no tell-tale marks behind.

The features and the benefits of the divider 10 are envisioned to include, but not be limited to, keeping disease spread from spreading to/from the driver 85; peace of mind; allows for visual contact of the rear seat area 80 by the driver 85; vision through the front of the vehicle by occupants of the rear seat area 80; ease of installation and removal of the divider 10, and access of air and power via the vent openings 40 and the electrical openings 45 respectively.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A vehicle passenger compartment divider, comprising:
a planar material adapted to prevent passage of a plurality of germs and a plurality of viruses within a vehicle;
a viewing window disposed on an upper center portion of the planar material, the viewing window is adapted to a rear seat area and use of a rear-view mirror by a driver of the vehicle as well as forward vision for one or more rear seat occupants;
at least six tie strings adapted to a plurality of connection points inside of the vehicle, the tie strings are tied in a plurality of knots to secure the planar material in position;
a means for attaching utilized in lieu of the tie strings attaching to the connection points inside of the vehicle, the means for attaching includes a first half and a second half;
a structural support bar utilized directly across a top portion of the planar material adapted to support along a head liner of the vehicle where no other means of support are available;
a plurality of vent openings adapted to pass conditioned air from a ventilation system of the vehicle; and
a plurality of electrical openings disposed near the center console;
wherein there are at least three of the at least six tie strings disposed alongside each other;
wherein the structural support bar is selected from the group consisting of a wooden dowel, a steel rod, or a plastic rod; and
wherein the vent openings and the electrical openings are each provided with a fabric cover that allow for closing and securing of the openings when not in use.

2. The vehicle passenger compartment divider, according to claim 1, wherein the planar material serves to hold the viewing window and the structural support bar contained with a textile sleeve.

3. The vehicle passenger compartment divider, according to claim 1, wherein the planar material is made of a material selected from the group consisting of a textile fabric material, a vinyl material, a plastic material, or a hybrid blend material.

4. The vehicle passenger compartment divider, according to claim 1, wherein the viewing window provides vision for an occupant of the rear seat area in a forward-looking manner, while allowing the driver a sight path through the rear-view mirror.

5. The vehicle passenger compartment divider, according to claim 1, wherein the viewing window is made of a clear flexible vinyl material.

6. The vehicle passenger compartment divider, according to claim 1, wherein the viewing window is twenty-eight inches wide and fourteen inches tall.

7. The vehicle passenger compartment divider, according to claim 1, wherein the connection points are selected from the group consisting of a plurality of garment hooks, a plurality of grab handles, a plurality of pillars, a plurality of columns, a plurality of structural components of the seat belt mechanism, or a plurality of trim pieces.

8. The vehicle passenger compartment divider, according to claim 1, wherein the means for attaching is utilized in lieu of the tie strings.

9. The vehicle passenger compartment divider, according to claim 1, wherein the first half of the means for attaching is adapted to the headliner of the vehicle.

10. The vehicle passenger compartment divider, according to claim 1, wherein the vent openings are located below a front seat area and in the center console.

11. The vehicle passenger compartment divider, according to claim 10, wherein the vehicle passenger compartment divider is adapted to separate the front seat area from a passenger compartment in the vehicle.

12. The vehicle passenger compartment divider, according to claim 10, wherein the vehicle passenger compartment divider is adapted to be directly behind the vehicle's front seats separating the passenger compartment into the front seat area and the rear seat area.

13. The vehicle passenger compartment divider, according to claim 1, wherein the electrical openings are selected from the group consisting of one or more 12-VDC cigarette lighter outlets, one or more USB outlets, and one or more 120-V AC receptacles.

14. The vehicle passenger compartment divider, according to claim 1, wherein the fabric covers are secured with a means for securing.

15. The vehicle passenger compartment divider, according to claim 14, wherein the means for securing is a snap fastener.

16. The vehicle passenger compartment divider, according to claim 14, wherein the means for securing is a hook-and-loop-type fastener.

* * * * *